(12) United States Patent
Wang et al.

(10) Patent No.: US 12,472,481 B2
(45) Date of Patent: Nov. 18, 2025

(54) MICROFLUIDICS-BASED NANOPARTICLE SYNTHESIS SYSTEM, AND DEVICE AND METHOD USING SAME

(71) Applicants: Precigenome LLC; Suzhou Precigenome Ltd, Co., Suzhou (CN)

(72) Inventors: Yaqi Wang, Suzhou (CN); Yiqiu Xia, Suzhou (CN); Yunfeng Ling, Suzhou (CN); Chen Li, Suzhou (CN); Zihao Dai, Suzhou (CN); Hua Zhang, Suzhou (CN); Xuemei Li, Suzhou (CN)

(73) Assignees: Precigenome LLC, San Jose, CA (US); Suzhou Precigenome Ltd, Co., Suzhou (CN)

(*) Notice: Subject to any disclaimer, the term of this patent is extended or adjusted under 35 U.S.C. 154(b) by 629 days.

(21) Appl. No.: 17/941,029

(22) Filed: Sep. 9, 2022

(65) Prior Publication Data

US 2023/0080771 A1 Mar. 16, 2023

(30) Foreign Application Priority Data

Sep. 10, 2021 (CN) .......................... 202111060959.0
Aug. 4, 2022 (CN) .......................... 202222042857.2

(51) Int. Cl.
*B01J 19/00* (2006.01)
*B01J 19/06* (2006.01)

(52) U.S. Cl.
CPC ....... *B01J 19/0093* (2013.01); *B01J 19/0006* (2013.01); *B01J 19/06* (2013.01);
(Continued)

(58) Field of Classification Search
CPC .......... B01F 23/00; B01F 23/40; B01F 23/41; B01F 23/49; B01F 33/00; B01F 33/30; B01F 35/00; B01F 35/20; B01F 35/22; B01F 35/221; B01F 35/2211; B01F 35/71; B01F 35/717; B01F 35/7174; B01F 35/71745; B01J 19/00; B01J 19/0006; B01J 19/0093; B01J 19/06; B01J 2219/00; B01J 2219/00781; B01J 2219/00801; B01J 2219/0081; B01J 2219/00813; B01J 2219/00889; B01J 2219/00891; B01J 2219/0095; B01J 2219/00952; B01J 2219/00954; B01J 2219/00959; B01J 2219/00963; B01J 2219/0099

See application file for complete search history.

(56) References Cited

U.S. PATENT DOCUMENTS 9,957,554 B1 * 5/2018 Wu ...................... C12Q 1/6837

* cited by examiner

*Primary Examiner* — Natasha E Young
(74) *Attorney, Agent, or Firm* — Bayramoglu Law Offices LLC

(57) ABSTRACT

A microfluidics-based nanoparticle synthesis system, a device and a synthesis method thereof are provided. The nanoparticle synthesis system comprises: a microfluidic chip; a reagent bottle which is connected with the microfluidic chip; and a flow control assembly comprising a pressure controller which is used for controlling the pressure in the reagent bottle. The system achieves high-accuracy flow control, and a microfluidic chip that can achieve high-efficiency and rapid mixing is also used in combination to finally achieve high-throughput and high-uniformity nanoparticle synthesis. A user may adjust the same instrument as required to achieve different throughputs without redesigning the instrument.

19 Claims, 10 Drawing Sheets

(52) U.S. Cl.
CPC ............ *B01J 2219/00813* (2013.01); *B01J 2219/00889* (2013.01); *B01J 2219/00891* (2013.01); *B01J 2219/00959* (2013.01); *B01J 2219/00963* (2013.01); *B01J 2219/0099* (2013.01)

MICROFLUIDICS-BASED NANOPARTICLE SYNTHESIS SYSTEM, AND DEVICE AND METHOD USING SAME

CROSS REFERENCE TO THE RELATED APPLICATIONS

This application is based upon and claims priority to Chinese Patent Application No. 202111060959.0, filed on Sep. 10, 2021; Chinese Patent Application No. 202222042857.2, filed on Aug. 4, 2022, the entire contents of which are incorporated herein by reference.

TECHNICAL FIELD

The present disclosure belongs to the technical field of microfluidics and nanomaterial synthesis, and in particular relates to a microfluidics-based nanoparticle synthesis system, and a device and synthesis method using the same.

BACKGROUND

Nanoparticle synthesis technology is the technological frontier in the fast-growing nanotechnology field, and the unique size-dependent properties of nanoparticles allow these materials to show great advantages and play an irreplaceable role in many fields. Nanoparticle synthesis technology has been widely used in many industries, such as drug delivery, energy, electronics, and the like. Nanoparticle synthesis technology is one of the key steps to realize nanoparticle applications.

Since the size properties of nanoparticles need to be used in most applications, the reproducibility of size distribution, yield and size between batches of nanoparticle synthesis are very important parameters in the evaluation of nanoparticle synthesis. One of the traditional nanoparticle synthesis methods is based on the principle of batch mixing. Particularly, raw materials for preparing nanoparticles are dissolved in an organic or aqueous phase, and then the resulting mixture is added to another aqueous or organic phase having poor compatibility with it for quick mixing in a beaker or another device by stirring. However, when the traditional batch synthesis method (mixing in a bulk solution) is used for large-scale production of nanoparticles, the synthesized particles have low quality, and there are also some uncontrollable factors, such as aggregation and heterogeneous mixing, resulting in poor size uniformity and reproducibility of nanoparticles.

A microfluidics-based micro-reactor can realize rapid mixing of reagents, temperature control, and precise space-time manipulation in a reaction. When microfluidics is used for nanoparticle synthesis, mixing is controllable and uniform, thus nanoparticles with uniform size may be produced, and the repeatability of physical and chemical properties of the nanoparticles can also be precisely controlled. In addition, the microenvironment of nanoparticle synthesis may be regulated to further improve the size uniformity and reproducibility of nanoparticles, thereby improving the yield of a preparation process of the nanoparticles.

At present, instruments for microfluidics-based nanoparticle synthesis in the market mainly come from Precision Nanosystems in Canada. In this instrument, a syringe pump is mainly used to push an organic phase solution and an aqueous phase solution into a microfluidic chip for mixing, and the synthesized nanoparticles are collected at the outlet of the microfluidic chip. This instrument achieves very high size controllability, uniformity, and reproducibility for nanoparticles. Since a syringe pump is used as the power source to push the fluids, there are some insurmountable disadvantages. When a flow is adjusted by the syringe pump, there are problems such as large volume, low response speed, low adjustment accuracy, existence of flow pulse, low sample usage efficiency, and being easily contaminated. The flow pulse and low adjustment accuracy will compromise the thorough mixing during nanoparticle synthesis, thereby reducing the uniformity of nanoparticles. In addition, to use the syringe pump, a reagent needs to be loaded into a syringe, which is complicated to operate and easily causes contaminations. In addition, the capacity of the syringe is limited, thus it requires much more engineering design and improvement for a scale-up production process, and it is not convenient for direct use of syringes in high-throughput production.

SUMMARY

In order to solve the deficiencies in the prior art, the present disclosure provides a microfluidics-based nanoparticle synthesis system, and a device and synthesis method using the same.

The objective of the present disclosure is achieved by the following technical solutions.

A microfluidics-based nanoparticle synthesis system, including: a microfluidic chip; a reagent bottle which is connected to the microfluidic chip; and a flow control assembly including a pressure controller which is used for controlling the pressure in the reagent bottle.

Preferably, the microfluidics-based nanoparticle synthesis system further includes: a washing solution bottle; a control valve by which the microfluidic chip is connected to the reagent bottle and washing solution bottle, where the flow control assembly is provided between the control valve and the reagent bottle and washing solution bottle.

Preferably, the reagent bottle includes an organic phase reagent bottle and an aqueous phase reagent bottle, and the washing solution bottle includes an organic phase washing solution bottle and an aqueous phase washing solution bottle.

Preferably, two flow control assemblies are provided in the system, each of the two flow control assemblies further includes a flow sensor which is electrically connected to the pressure controller.

Preferably, the system further includes a waste liquid bottle and a collection tube, where the waste liquid bottle and the collection tube are each connected to the microfluidic chip through the control valve.

Preferably, the control valve is a three-way valve.

Preferably, the aqueous phase reagent bottle and the aqueous phase washing solution bottle are respectively connected to the normally-closed valve port and the normally-open valve port of a first three-way valve, and the common valve port of the first three-way valve is connected to the common valve port of a third three-way valve through a first flow sensor; and where the normally-closed valve port of the third three-way valve is in fluid communication with the aqueous phase port of the microfluidic chip, and the normally-open valve port of the third three-way valve is connected to the waste liquid bottle;

the organic phase reagent bottle and the organic phase washing solution bottle are respectively connected to the normally-closed valve port and the normally-open valve port of a second three-way valve, and the common valve port of the second three-way valve is connected to a second flow sensor, and the second flow sensor is connected to the common valve port of a fourth three-way valve;

the waste liquid bottle is further connected to the normally-open valve port of a fifth three-way valve, the normally-closed valve port of the fifth three-way valve is connected to a collection tube, and the common valve port of the fifth three-way valve is connected to the outlet of the microfluidic chip; and the pressure controller is respectively connected to the air pressure control end of each of the aqueous phase reagent bottle, the aqueous phase washing solution bottle, the organic phase reagent bottle, and the organic phase washing solution bottle, where the pressure controller is respectively further connected to the pressure control end of each of the first flow sensor and the second flow sensor.

Preferably, the reagent bottle includes an organic phase reagent bottle and an aqueous phase reagent bottle, and the organic phase reagent bottle and the aqueous phase reagent bottle are respectively connected to the organic phase port and the aqueous phase port of the microfluidic chip;

the system further includes:
a collection bottle for collecting the fluid discharging from the outlet of the microfluidic chip;
a diluent bottle, where the pressure in the diluent bottle is also controlled by the pressure controller;
a mixer component, which is respectively connected to the diluent bottle, the outlet of the microfluidic chip and the collection bottle, so that the fluid discharging from the diluent bottle and the outlet of the microfluidic chip is mixed in the mixer component before entering the collection bottle.

Preferably, the microfluidics-based nanoparticle synthesis system further includes: a first flow sensor, which is provided between the organic phase reagent bottle and the organic phase port of the microfluidic chip, where the pressure in the organic phase reagent bottle is controlled by the pressure controller based on the flow rate feedback from the first flow sensor so as to control the flow rate to reach a preset value; and/or a second flow sensor, which is provided between the aqueous phase reagent bottle and the aqueous phase port of the microfluidic chip, where the pressure in the aqueous phase reagent bottle is controlled by the pressure controller based on the flow rate feedback from the second flow sensor so as to control the flow rate to reach a preset value; and/or a third flow sensor, which is provided between the diluent bottle and the mixer component, where the pressure in the diluent bottle is controlled by the pressure controller based on the flow rate feedback from the third flow sensor so as to control the flow rate to reach a preset value.

Preferably, the microfluidics-based nanoparticle synthesis system further includes: a first control valve, which is provided between the organic phase reagent bottle and the organic phase port of the microfluidic chip, so as to control the fluid passage to be an open or closed state; and/or a second control valve, which is provided between the aqueous phase reagent bottle and the aqueous phase port of the microfluidic chip, so as to control the fluid passage to be an open or closed state; and/or a third control valve, which is provided between the diluent bottle and the mixer component, so as to control the fluid passage to be an open or closed state.

Preferably, the microfluidics-based nanoparticle synthesis system further includes: a waste liquid bottle; a fourth control valve, which is respectively connected to the mixer component, the waste liquid bottle and the collection bottle, so that the fluid discharging from the mixer component may enter the collection bottle or the waste liquid bottle.

Preferably, the microfluidics-based nanoparticle synthesis system further includes: a fifth control valve, which is provided between the organic phase reagent bottle and the organic phase port of the microfluidic chip, and connected to the waste liquid bottle, so that the fluid discharging from the organic phase reagent bottle may enter the organic phase port of the microfluidic chip or the waste liquid bottle; and/or a sixth control valve, which is provided between the aqueous phase reagent bottle and the aqueous phase port of the microfluidic chip, and connected to the waste liquid bottle, so that the fluid discharging from the aqueous phase reagent bottle may enter the aqueous phase port of the microfluidic chip or the waste liquid bottle.

Preferably, the collection bottle is in fluid communication with the atmosphere through a filter element.

Preferably, the volume of the organic phase reagent bottle, the aqueous phase reagent bottle and/or the diluent bottle is greater than or equal to 0.1 L.

Preferably, the mixer component is a three-way mixer which has a three-way connector with a Y or T shape.

Preferably, the microfluidics-based nanoparticle synthesis system further includes a chip cassette in which the microfluidic chip is provided; and the chip cassette includes: a cover board of the chip cassette; a bottom board of the chip cassette, where the microfluidic chip is provided between the cover board of the chip cassette and the bottom board of the chip cassette; a connector, where a plurality of connectors is respectively connected to the organic phase port, the aqueous phase port and outlet of the microfluidic chip, so as to connect to the organic phase reagent bottle, the aqueous phase reagent bottle and the mixer component.

Preferably, the connector is a Luer connector.

Also provided herein is a device using the above mentioned microfluidics-based nanoparticle synthesis system, which includes a bench, where a microfluidic chip assembly and a flow control assembly are provided above the bench, and the organic phase reagent bottle, the aqueous phase reagent bottle, the organic phase washing solution bottle, and the aqueous phase washing solution bottle are provided side by side below the bench; and the waste liquid bottle is provided at an inner side of the reagent bottle.

Preferably, a height-adjustable sampling needle assembly is provided on each of the organic phase reagent bottle and the aqueous phase reagent bottle.

Preferably, the microfluidic chip assembly includes a base and a transfer tooling embedded in the base, and a chip is provided in the transfer tooling; a flip cover is provided at one side of the base, and a locking mechanism for locking the flip cover is provided at the other side of the base; the inner wall of the flip cover is provided with a guide rod for cooperating with a protruding sample injection channel on the chip, and a through hole is formed in a center of the guide rod; and the flip cover is provided at one side of the base through an elastic assembly, a pivot of the flip cover is provided on the elastic assembly, and a sample injection channel mark is provided on each of the transfer tooling and the base.

Also provided herein is a synthesis method using the above mentioned microfluidics-based nanoparticle synthesis system, which includes the following steps:

S1. using the flow control assembly to extrude out the aqueous phase and the organic phase respectively from the aqueous phase reagent bottle and the organic phase reagent bottle according to the presetting, and allowing the aqueous phase and the organic phase to respectively enter the aqueous phase port and the organic phase port of the microfluidic chip through a corresponding three-way valve for nanoparticle synthesis; and S2. when the synthesized nanoparticles do not meet the size requirement, delivering the synthesized nanoparticles that do not meet the requirement to the waste liquid bottle for collection through the fifth three-way valve; and when the synthesized nanoparticles meet the size requirement, delivering the synthesized nanoparticles that meet the requirement to the collection tube for collection through the fifth three-way valve.

Preferably, the method further includes pre-processing steps before synthesis steps: using the flow control assembly to extrude out the aqueous phase and the organic phase respectively from the aqueous phase reagent bottle and the organic phase reagent bottle according to the presetting, and allowing the aqueous phase and the organic phase to enter the waste liquid bottle correspondingly through the three-way valves for removing bubbles in pipelines.

Advantages of the present disclosure: the system achieves high-accuracy flow control, and it is used in combination with a microfluidic chip having high-efficiency and rapid mixing effect to finally achieve high-throughput and high-uniformity nanoparticle synthesis. The same instrument may be adjusted by a user as required to achieve different throughputs without redesigning the instrument.

Figure 1:
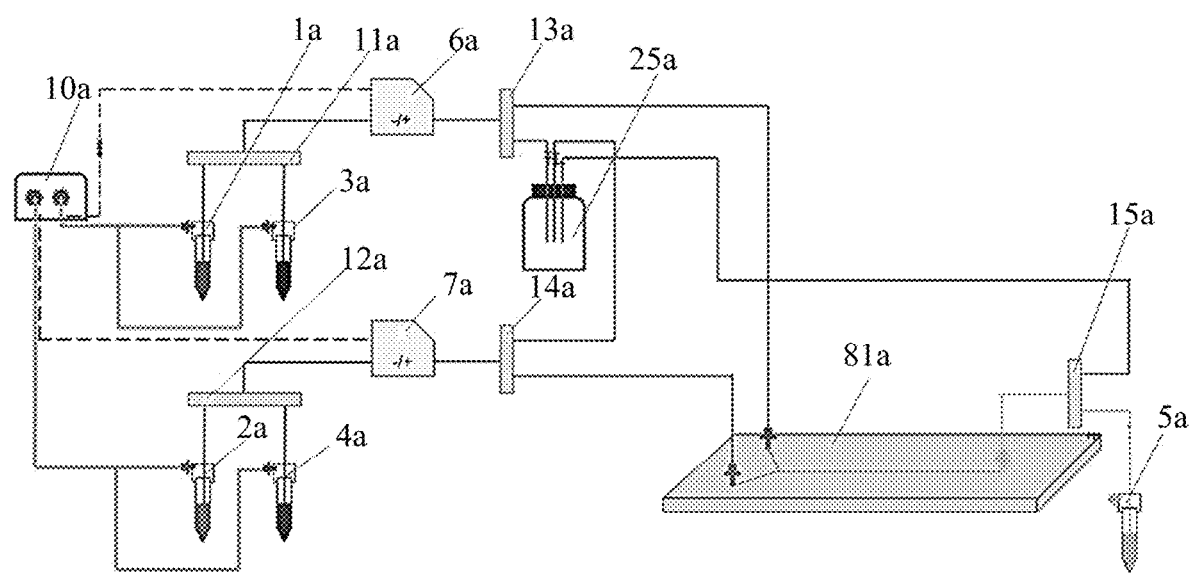
FIG. 1 is a schematic diagram of the structure of the microfluidics-based nanoparticle synthesis system according to the first embodiment of the present disclosure.
Figure 2:
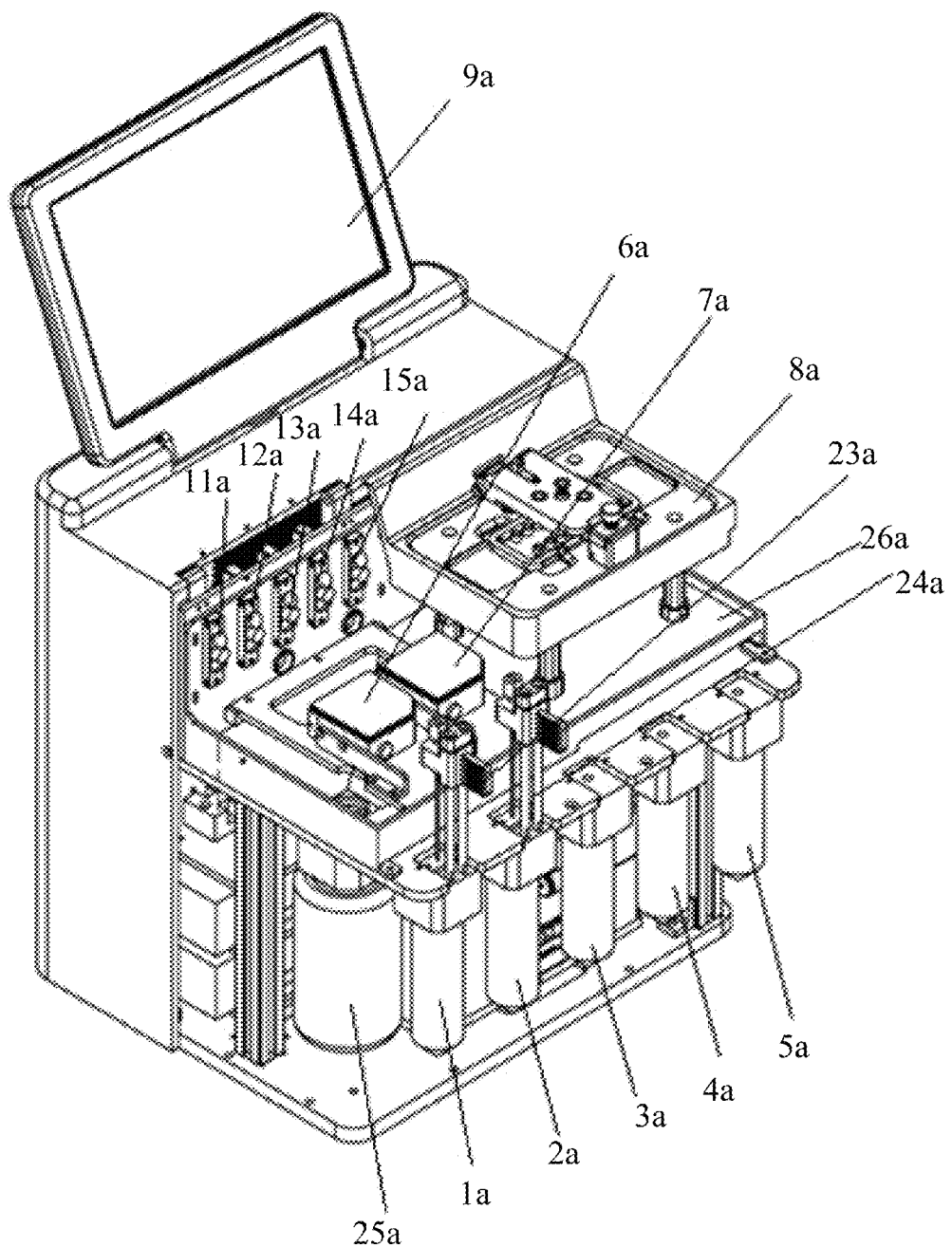
FIG. 2 is a schematic diagram of the three-dimensional (3D) structure of the device according to the first embodiment of the present disclosure.
Figure 3:
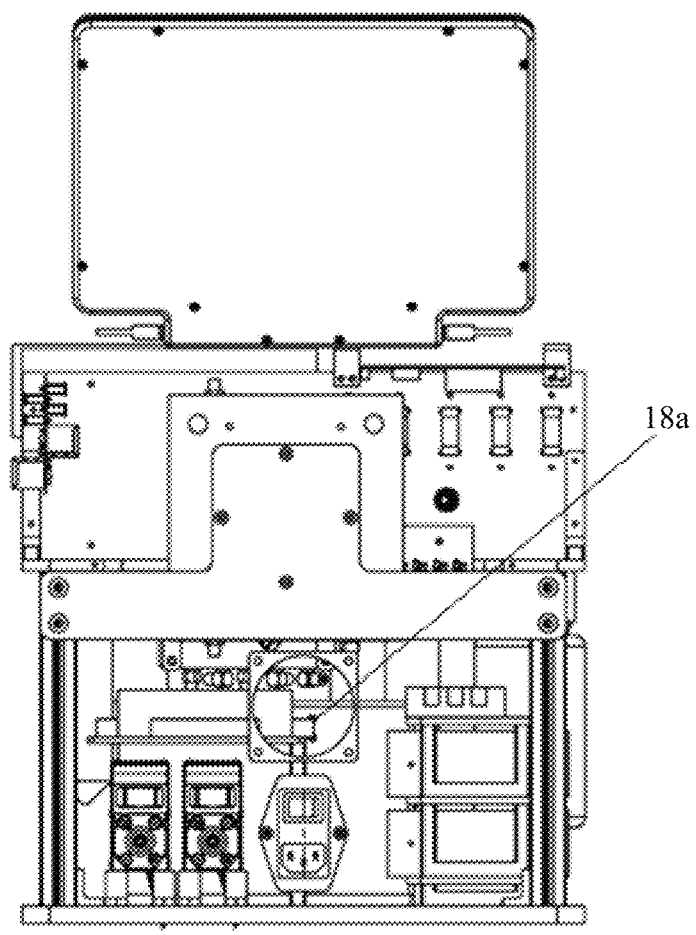
FIG. 3 is a schematic diagram of the rear structure of FIG. 2.
Figure 4:
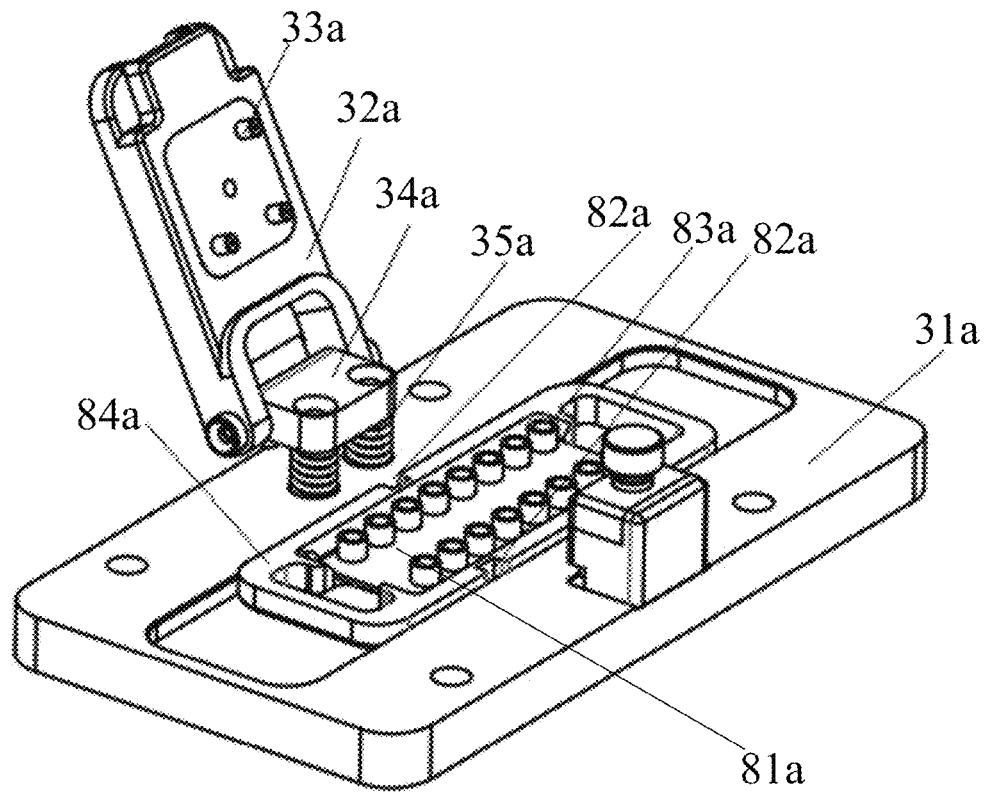
FIG. 4 is a schematic diagram of the structure of the chip assembly according to the first embodiment of the present disclosure, where the flip cover is in an open state.
Figure 5:
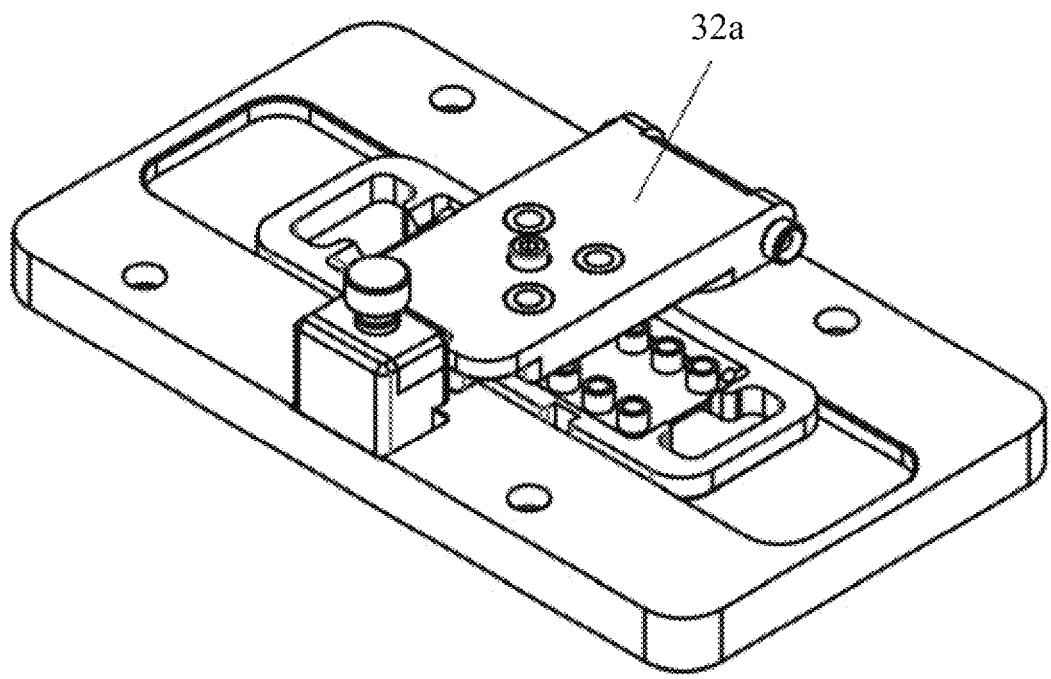
FIG. 5 is a schematic diagram of the structure of the chip assembly according to the first embodiment of the present disclosure, where the flip cover is in a closed state.
Figure 6:
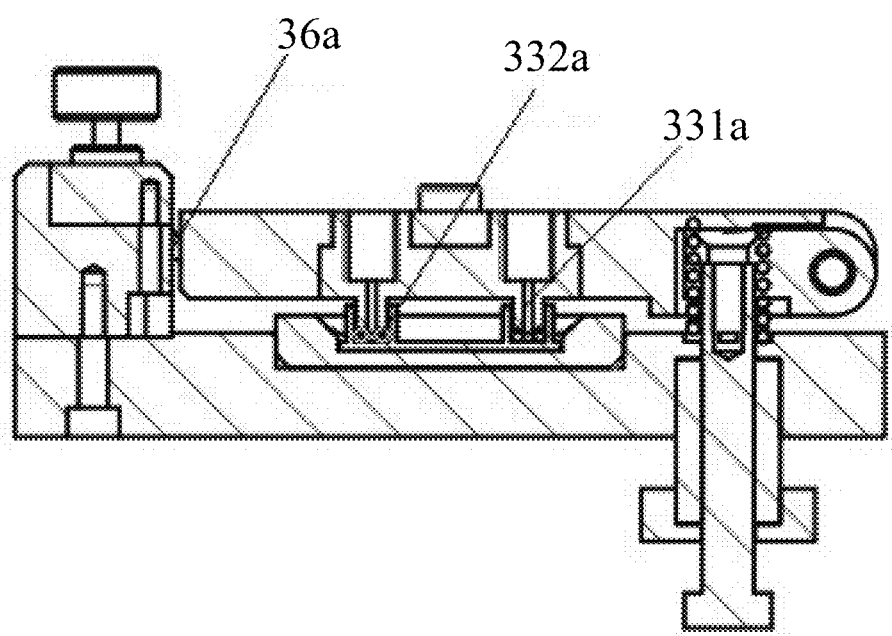
FIG. 6 is a side view of FIG. 5.

In the figures, $1a$ represents an aqueous phase reagent bottle; $2a$ represents an organic phase reagent bottle; $3a$ represents an aqueous phase washing solution bottle; $4a$ represents an organic phase washing solution bottle; $5a$ represents a collection tube; $6a$ represents a first flow sensor; $7a$ represents a second flow sensor; $25a$ represents a waste liquid bottle; $11a$ represents a first three-way valve; $12a$ represents a second three-way valve; $13a$ represents a third three-way valve; $14a$ represents a fourth three-way valve; $15a$ represents a fifth three-way valve; $18a$ represents a fan; $23a$ represents an aqueous phase sample injection needle assembly; $24a$ represents an organic phase sample injection needle assembly; $26a$ represents a bench; $31a$ represents a base; $32a$ represents a flip cover; $33a$ represents a guide rod; $34a$ represents a pressing block; $35a$ represents a spring; $36a$ represents a snap; $332a$ represents a sealing ring; $8a$ represents a microfluidic chip assembly; $81a$ represents a microfluidic chip; $82a$ represents a groove; $83a$ represents a sample injection channel; $84a$ represents a transfer tooling; $9a$ represents an operation screen; and $10a$ represents a pressure controller.

$1b$ represents a microfluidic chip; $2b$ represents an organic phase reagent bottle; $3b$ represents an aqueous phase reagent bottle; $4b$ represents a collection bottle; $5b$ represents a pressure controller; $6b$ represents a diluent bottle; $7b$ represents a mixer component; $8b$ represents a first flow sensor; $9b$ represents a second flow sensor; $10b$ represents a third flow sensor; $11b$ represents a first control valve; $12b$ represents a second control valve; $13b$ represents a third control valve; $14b$ represents a waste liquid bottle; $15b$ represents a fourth control valve; $16b$ represents a chip cassette; $16\text{-}1b$ represents a cover board of the chip cassette; $16\text{-}2b$ represents a bottom board of the chip cassette; $16\text{-}3b$ represents an connector; $17b$ represents a IPC (industrial personal computer); $18b$ represents an emergency stop switch; $19b$ represents an input port of external gas source; $20b$ represents an output port of air pressure.

DETAILED DESCRIPTION OF THE EMBODIMENTS

The present application discloses a microfluidics-based nanoparticle synthesis system in the first embodiment. As shown in FIGS. 1-6, the system includes: a microfluidic chip $81a$, and a reagent bottle and a washing solution bottle that are respectively connected to the microfluidic chip $81a$ through a control valve; where a flow control assembly is provided between the control valve and each of the reagent bottle and the washing solution bottle. In this embodiment, the control valve may be a three-way valve, including: a first three-way valve $11a$, a second three-way valve $12a$, a third three-way valve $13a$, a fourth three-way valve $14a$, and a fifth three-way valve $15a$.

The reagent bottles may include an aqueous phase reagent bottle $1a$ and an organic phase reagent bottle $2a$; and the washing solution bottles may include an aqueous phase washing solution bottle $3a$ and an organic phase washing solution bottle $4a$. The system may further include a waste liquid bottle $25a$ and a collection tube $5a$ that are respectively connected to the microfluidic chip $81a$ through a control valve. Two flow control assemblies may be provided in the system, and each of the flow control assemblies may include a flow sensor and a pressure controller $10a$ which is electrically connected to the flow sensor.

Particularly, the aqueous phase reagent bottle $1a$ and the aqueous phase washing solution bottle $3a$ may be respectively connected to the normally-closed valve port and the normally-open valve port of a first three-way valve $11a$, and the common valve port of the first three-way valve $11a$ may be connected to the common valve port of a third three-way valve $13a$ through a first flow sensor $6a$; the normally-closed valve port of the third three-way valve $13a$ may be in fluid communication with an aqueous phase port of the microfluidic chip 81a, and the normally-open valve port of the third three-way valve 13a may be connected to the waste liquid bottle 25a. The pressure controller 10a may be connected to the air pressure control end of each of the aqueous phase reagent bottle 1a and the aqueous phase washing solution bottle 3a, and the pressure controller 10a may be electrically connected to the pressure control end of the first flow sensor 6a through a data cable.

The organic phase reagent bottle 2a and the organic phase washing solution bottle 4a may be respectively connected to the normally-closed valve port and the normally-open valve port of a second three-way valve 12a, and the common valve port of the second three-way valve 12a may be connected to a second flow sensor 7a; and the second flow sensor 7a may be connected to the common valve port of a fourth three-way valve 14a, and the normally-open valve port of the fourth three-way valve 14a may be in fluid communication with the waste liquid bottle 25a. The pressure controller 10a may be connected to the air pressure control end of each of the organic phase reagent bottle 2a and the organic phase washing solution bottle 4a, and the pressure controller 10a may be further connected to the pressure control end of the second flow sensor 7a through a data cable.

The waste liquid bottle 25a may be further connected to the normally-open valve port of a fifth three-way valve 15a, the normally-closed valve port of the fifth three-way valve 15a may be connected to the collection tube 5a, and the common valve port of the fifth three-way valve 15a may be connected to an outlet of the microfluidic chip 81a. A first power module, a second power module, and the flow control assembly may be each electrically connected to a main control unit.

The present application also discloses a device using the microfluidics-based nanoparticle synthesis system described above, which includes a housing formed by left and right parts that match with each other. The housing is provided with an operation screen 9a, one inner side of the housing is provided with a pipeline control zone, and the other inner side is provided with an industrial control zone for controlling pipelines. The pipeline control zone may include a bench 26a, and a microfluidic chip assembly 8a and a flow control assembly may be provided side by side above the bench 26a. The flow control assembly may include a first flow sensor 6a and a second flow sensor 7a. The microfluidic chip assembly 8a may be exposed on the housing.

The aqueous phase reagent bottle 1a, the organic phase reagent bottle 2a, the aqueous phase washing solution bottle 3a, the organic phase washing solution bottle 4a, and the collection tube 5a may be provided side by side below the bench 26a, and the waste liquid bottle 25a may be provided at the inner side of the reagent bottle. The reagent bottles can have different volumes as required, and generally, the reagent bottles may each adopt a threaded connection to form an airtight connection with the device. The aqueous phase reagent bottle 1a and the organic phase reagent bottle 2a may be respectively provided with a height-adjustable aqueous phase sample injection needle assembly 23a and a height-adjustable organic phase sample injection needle assembly 24a. In order to well cooperate with the sample injection needle assembly to control the height of a sample injection needle, a height adjustment groove may be correspondingly formed on the housing, and a height control part of the sample injection needle assembly may penetrate through the groove and be provided outside the housing.

The microfluidic chip assembly 8a may include a base 31a and a transfer tooling 84a embedded in the base 31a, and a microfluidic chip 81a may be provided in the transfer tooling 84a. A sample injection channel 83a may be provided protruding on the microfluidic chip 81a, and a sealing ring 332a may be provided in the sample injection channel 83a. In order to well identify the sample injection channel, the transfer tooling 84a and the base 31a may be each provided with a corresponding sample injection mark. In this embodiment, the sample injection mark of the transfer tooling 84a may be a groove 82a. Since the chip generally has three channels, three grooves 82a may be provided in this embodiment. Correspondingly, the sample injection mark of the base 31a may be a protrusion matching the groove 82a.

A flip cover 32a may be provided at one side of the base 31a, and a locking mechanism for locking the flip cover 32a may be provided at the other side of the base 31a. A snap 36a may be provided on the locking mechanism.

An inner wall of the flip cover 32a may be provided with a guide rod 33a that cooperates with a protruding sample injection channel 83a on the microfluidic chip 81a, and a through hole 331a may be formed in the center of the guide rod 33a.

Particularly, the flip cover 32a may be provided at one side of the base 31a through an elastic assembly, and the pivot of the flip cover 32a may be provided on the elastic assembly. The elastic assembly may include a pressing block 34a, and a spring 35a may be arranged between the pressing block and the base 31a. The flip cover 32a may be flipped to drive the pressing block 34a to press the spring 35a, and the flip cover 32a may be locked to the microfluidic chip 81a through the snap 36a. In a locked state, the guide rod 33a presses against the sealing ring 332a to form a seal with the sample injection channel 83a, and the through hole 331a in the guide rod 33a is in fluid communication with the sample injection channel 83a. The locking mechanism may be provided with a button, and the button may be linked with the snap 36a, such that the locking between the snap 36a and the flip cover 32a may be released by pressing the button.

The industrial control zone may include a first and a second power modules, and a heat dissipation module for cooling. In this embodiment, the heat dissipation module may be a fan.

Moreover, the present application also discloses a nanoparticle synthesis method using the microfluidics-based nanoparticle synthesis system described above, which includes the following steps:

S1. using the flow control assembly to extrude out the aqueous phase and the organic phase respectively from the aqueous phase reagent bottle 1a and the organic phase reagent bottle 2a according to the presetting, and allowing the aqueous phase and the organic phase to respectively enter the aqueous phase port and the organic phase port of the microfluidic chip through a corresponding three-way valve for nanoparticle synthesis; and S2. when the synthesized nanoparticles do not meet the size requirement because the flow rate cannot immediately reach the preset value at the beginning of the nanoparticle synthesis, the valve port of the fifth three-way valve 15a connected to the waste liquid bottle 25a may be opened to deliver the synthesized nanoparticles that do not meet the requirement to the waste liquid bottle for collection; and when the flow rate reaches the preset value and synthesized nanoparticles meet the size requirement, the valve port of the fifth three-way valve 15a connected to the collection tube 5a may be opened to deliver the synthesized nanoparticles that meet the requirement to the collection tube for collection.

In order to make the reagent flow in the system stable, the synthesis method may further include pre-processing steps before synthesis steps: using the flow control assembly to extrude out the aqueous phase and the organic phase respectively from the aqueous phase reagent bottle 1a and the organic phase reagent bottle 2a according to the presetting, and allowing the aqueous phase and the organic phase to enter the waste liquid bottle correspondingly through the three-way valves for removing bubbles in pipelines.

When a system pipeline needs to be cleaned, the corresponding washing solution valve port may be opened to clean the pipeline.

The second embodiment of the application provided a microfluidics-based nanoparticle synthesis system, as shown in FIGS. 7-10, which includes:

a microfluidic chip 1b; particularly in this embodiment, the microfluidic chip 1b includes: an aqueous phase port, an organic phase port and an outlet;

an organic phase reagent bottle 2b, an aqueous phase reagent bottle 3b; the organic phase reagent bottle 2b and the aqueous phase reagent bottle 3b are respectively connected to the organic phase port and the aqueous phase port of the microfluidic chip 1b;

a collection bottle 4b for collecting the liquid flowing out from the outlet of the microfluidic chip 1b. In this embodiment, the volume of the collection bottle 4b is preferably 0.5-10 L, more preferably 10 L or more;

a diluent bottle 6b;

a mixer component 7b which is respectively connected to the diluent bottle 6b, the outlet of the microfluidic chip 1b and the collection bottle 4b, so that the fluid flowing out from the diluent bottle 6b and the outlet of the microfluidic chip 1b may be mixed in the mixer component 7b before entering the collection bottle 4b. There is no specific limitation on the structure of the mixer component 7b in the present application, as long as the two paths of liquid may be brought together for mixing well, the mixer component 7b may be a mixer or a mixing chip, and in this embodiment, the mixer component 7b is three-way mixer, particularly, the three-way mixer has a three-way connector with a Y or T shape;

a pressure controller 5b for controlling the pressure in the organic phase reagent bottle 2b, the aqueous phase reagent bottle 3b, and the diluent bottle 6b. As for the pressure controller 5b in this embodiment, a pressure controller with two or more channels (e.g., three channels) may be used to control the pressure in the organic phase reagent bottle 2b, the aqueous phase reagent bottle 3b, and the diluent bottle 6b, respectively. Alternatively, multiple single-channel pressure controllers may be used to control the pressure in the organic phase reagent bottle 2b, the aqueous phase reagent bottle 3b, and the diluent bottle 6b, respectively.

Through the above technical solution of this embodiment, the pressure in the organic phase reagent bottle 2b and the aqueous phase reagent bottle 3b may be controlled by the pressure controller 5b (for example, the pressure is controlled to a specific preset value), so that the organic phase and the aqueous phase are more stable while flowing into the microfluidic chip 1b, thereby substantively eliminating the pulsation of the organic phase and the aqueous phase while flowing, and improving the accuracy; as a result, the mixing uniformity of the nanoparticles in the microfluidic chip 1b is higher during synthesis, thereby improving the uniformity of nanoparticles during synthesis; at the same time, the pressure controller 5b controls the pressure in the diluent bottle 6b (for example, the pressure is controlled to a specific preset value) so that the diluent may smoothly flow into the mixer component 7b, then the synthesized nanoparticle solution may be uniformly mixed with the diluent to rapidly dilute the synthesized nanoparticle solution, thereby reducing the concentration of alcohol and the like to stably retain the nanoparticles.

The technical solution of the first embodiment realizes high-precision flow control through pressure control; it can reach a microfluidic chip with high efficiency and rapid mixing, and finally realize high-throughput and highly uniform nanoparticle synthesis. This embodiment improves the technical solution of the first embodiment, and a dilution module (diluent bottle 6b, mixer component 7b, etc.) is added, so that when the synthesized nanoparticle solution needs to be diluted it may be diluted stably and rapidly, thereby stably retaining the nanoparticles.

In addition, it should be noted that the "connection" referred in the present application may be a connection through pipeline. The pipeline may be a disposable pipeline consumable, which adopts a quick in-line connection mode to increase the efficiency of the connection and reduce the risk of contamination during the pipeline connection. The pipeline may also be a pipeline made of reusable materials that can withstand sterilization of high temperature, radiation, chemical and other methods, such as stainless steel pipelines. A user may directly inject liquid, steam, etc. into the pipeline for cleaning and sterilization, or perform high temperature sterilization.

In one implementation of the second embodiment of the present application, as shown in FIGS. 7-10, the microfluidics-based nanoparticle synthesis system further includes:

a first flow sensor 8b, which is provided between the organic phase reagent bottle 2b and the organic phase port of the microfluidic chip 1b, where the pressure in the organic phase reagent bottle 2b is controlled by the pressure controller 5b based on the flow rate feedback from the first flow sensor 8b so as to control the flow rate to reach a preset value; and/or a second flow sensor 9b, which is provided between the aqueous phase reagent bottle 3b and the aqueous phase port of the microfluidic chip 1b, where the pressure in the aqueous phase reagent bottle 3b is controlled by the pressure controller 5b based on the flow rate feedback from the second flow sensor 9b so as to control the flow rate to reach a preset value; and/or a third flow sensor 10b, which is provided between the diluent bottle 6b and the mixer component 7b, where the pressure in the diluent bottle 6b is controlled by the pressure controller 5b based on the flow rate feedback from the third flow sensor 10b so as to control the flow rate to reach a preset value.

Particularly, as shown in FIGS. 7-10, in this embodiment, a first flow sensor 8b, a second flow sensor 9b, and a third flow sensor 10b are simultaneously provided. By providing the above flow sensors (a first flow sensor 8b, a second flow sensor 9b, and a third flow sensor 10b), the flow rate of the liquid in the corresponding pipeline may be detected, so that the flow rate may be obtained through the controller (e.g., IPC 17b, industrial personal computer 17b; and the likes), and the IPC 17b controls the pressure controller 5b based on the flow rate so as to adjust the pressure in the corresponding reagent container (an organic phase reagent bottle 2b, an aqueous phase reagent bottle 3b, or a diluent bottle 6b), so that the flow rate of the liquid in the pipeline may be adjusted to a preset flow rate (i.e., the pressure controller may adjust the pressure through negative feedback to control the flow rate to reach a preset value).

By providing a first flow sensor 8b, a second flow sensor 9b and/or a third flow sensor 10b, the flow rate of the liquid in the corresponding pipeline may be easily adjusted to a preset value, so that the outflowing liquid is more stable and the pulsation of the liquid flow is substantively eliminated.

In one implementation of the second embodiment of the present application, as shown in FIGS. 7-10, the microfluidics-based nanoparticle synthesis system further includes:
- a first control valve 11b, which is provided between the organic phase reagent bottle 2b and the organic phase port of the microfluidic chip 1b, so as to control the fluid passage to be an open or closed state; and/or
- a second control valve 12b, which is provided between the aqueous phase reagent bottle 3b and the aqueous phase port of the microfluidic chip 1b, so as to control the fluid passage to be an open or closed state; and/or
- a third control valve 13b, which is provided between the diluent bottle 6b and the mixer component 7b, so as to control the fluid passage to be an open or closed state.

Particularly, as shown in FIGS. 7-10, in this embodiment, a first control valve 11b, a second control valve 12b, and a third control valve 13b are simultaneously provided, all of which are two-way valves, such as a two-way pinch pipe valve.

Figure 10:
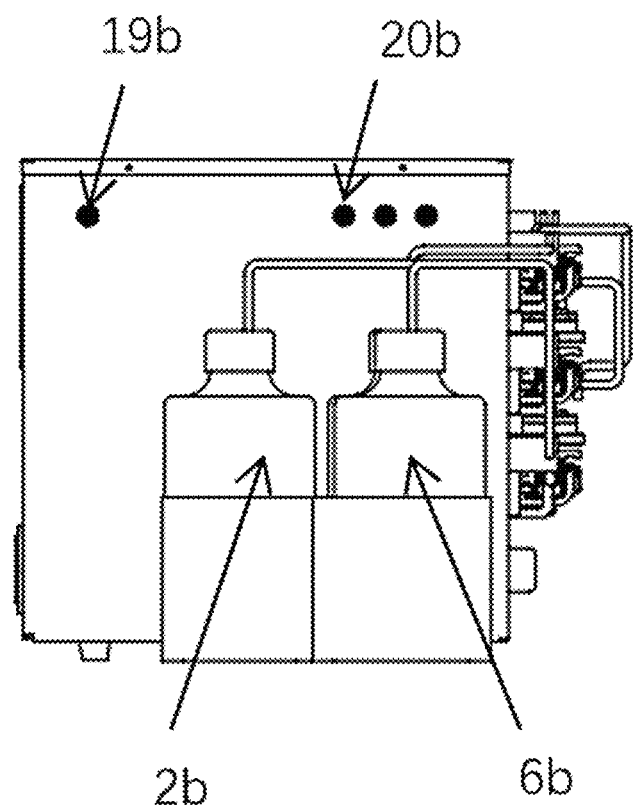
FIG. 10 is a left view of the microfluidics-based nanoparticle synthesis system according to the second embodiment of the present disclosure.

In addition, as shown in FIG. 10, in this embodiment, the gas source is externally connected through the input port 19b of external gas source to provide air pressure. However, when mass production is required and the volume of the reagent container (an organic phase reagent bottle 2b, an aqueous reagent bottle 3b, or a diluent bottle 6b) is large, at this time, it takes some time for the gas source to compress the air in the reagent container to a certain pressure. Therefore, when the gas source starts to supply gas to the reagent container, the pressure in the reagent container is low, which will cause the pressure to fail to reach the preset value, or the low air pressure will cause the liquid flow rate to fail to reach the preset value, so that the flow rates of the aqueous phase and organic phase are different and the fluid streams are unstable, which results in uneven mixing and make it difficult to meet the needs of nanoparticle synthesis.

In this embodiment, by providing the control valves (a first control valve 11b, a second control valve 12b, a third control valve 13b), when the gas source starts to supply gas to the reagent container (an organic phase reagent bottle 2b, an aqueous reagent bottle 3b, or a diluent bottle 6b), the control valve is closed to make the pressure in the reagent container rapidly increased. After the pressure reaches a certain level, or after a certain period of time, the control valve is opened, so that when the liquid first enters the microfluidic chip, the pressure in the reagent container may quickly reach the preset value, or the flow rate of the liquid may rapidly reach the preset value.

Through the above technical solution, at the initial stage, when the liquid first enters the microfluidic chip, the pressure in the reagent container may quickly reach the preset value, or the flow rate of the liquid may quickly reach the preset value, thereby rapidly starting to stably synthesize the nanoparticles.

In one implementation of the second embodiment of the present application, as shown in FIGS. 7-10, the microfluidics-based nanoparticle synthesis system further includes:
- a waste liquid bottle 14b;
- a fourth control valve 15b, which is respectively connected to the mixer component 7b, the waste liquid bottle 14b and the collection bottle 4b, so that the fluid discharging from the mixer component 7b may enter the collection bottle or the waste liquid bottle.

In this embodiment, the fourth control valve 15b is a three-way valve, such as a three-way pinch valve.

In the initial stage of nanoparticle synthesis, the flow rate of the aqueous or organic phase cannot be rapidly stabilized, or the aqueous and organic phases cannot reach the chip inlet at the same time due to the different flow rates of the aqueous and organic phases, resulting in low quality of the nanoparticles synthesized at the beginning.

By providing the above-mentioned fourth control valve 15b (three-way valve), in the initial stage of synthesis, the mixer component 7b may be in fluid communication with the waste liquid bottle 14b, and nanoparticles of lower quality may be introduced into the waste liquid bottle 14b; when the quality of the synthesized nanoparticles is good and stable, the fourth control valve 15b is controlled to make the mixer component 7b be in fluid communication with the collection bottle 4b so as to collect the synthesized nanoparticle solution, ensuring that the nanoparticles in the collection bottle 4b are of high quality and uniformity.

In one implementation of the second embodiment of the present application, the microfluidics-based nanoparticle synthesis system further includes:
- a fifth control valve, which is provided between the organic phase reagent bottle 2b and the organic phase port of the microfluidic chip 1b, and connected to the waste liquid bottle 14b, so that the fluid discharging from the organic phase reagent bottle 2b may enter the organic phase port of the microfluidic chip 1b or the waste liquid bottle 14b; and/or
- a sixth control valve, which is provided between the aqueous phase reagent bottle and the aqueous phase port of the microfluidic chip, and connected to the waste liquid bottle, so that the fluid discharging from the aqueous phase reagent bottle may enter the aqueous phase port of the microfluidic chip or the waste liquid bottle.

In this embodiment, a fifth control valve and a sixth control valve are provided at the same time (the fifth control valve and the sixth control valve are not shown in the drawings). In the structure shown in FIG. 7, the fifth control valve is provided between the first flow sensor 8b and the organic phase port of the microfluidic chip 1b and connected to the waste liquid bottle 14b; a sixth control valve is provided between the second flow sensor 9b and the aqueous phase port of the microfluidic chip 1b and connected to the waste liquid bottle 14b.

Therefore, in the initial stage of nanoparticle synthesis (the flow rate of the aqueous phase and the organic phase is unstable, and cannot meet the requirements of nanoparticle synthesis), the fifth control valve is controlled to make the liquid flowing out of the first flow sensor 8b passing through the fifth control valve to enter the waste liquid bottle 14b, and the sixth control valve is controlled to make the liquid flowing out of the second flow sensor 9b passing through the sixth control valve to enter the waste liquid bottle 14b, so as to prevent the aqueous phase or/and the organic phase that does not reach the preset flow rate from entering the chip to mix and produce lower quality nanoparticles. When the aqueous phase and the organic phase flow out stably, the fifth control valve is controlled to make the liquid flowing out of the first flow sensor 8b passing through the fifth control valve to enter the organic phase port of the microfluidic chip 1b, and the sixth control valve is controlled to make the liquid flowing out of the second flow sensor 9b passing through the sixth control valve to enter the aqueous phase port of the microfluidic chip 1b, and the nanoparticle solution is synthesized, thereby ensuring that the synthesized nanoparticles have high quality and good uniformity.

In an implementation of the second embodiment of the present application, the collection bottle is in fluid communication with the atmosphere through a filter element to prevent the external contaminants from entering and contaminating the collected nanoparticle solution.

In one implementation of the second embodiment of the present application, the volume of the organic phase reagent bottle 2b, the aqueous phase reagent bottle 3b, and/or the diluent bottle 6b is greater than or equal to 0.1 L, preferably greater than or equal to 1 L.

The organic phase reagent bottle 2b, the aqueous phase reagent bottle 3b, and the diluent bottle 6b with larger volumes are selected to meet the requirements of mass production.

In addition, the organic phase reagent bottle 2b, the aqueous phase reagent bottle 3b, and the diluent bottle 6b in this embodiment may adopt glass bottles/stainless steel bottles with different volumes to store the organic phase, the aqueous phase or the diluent.

Figure 11:
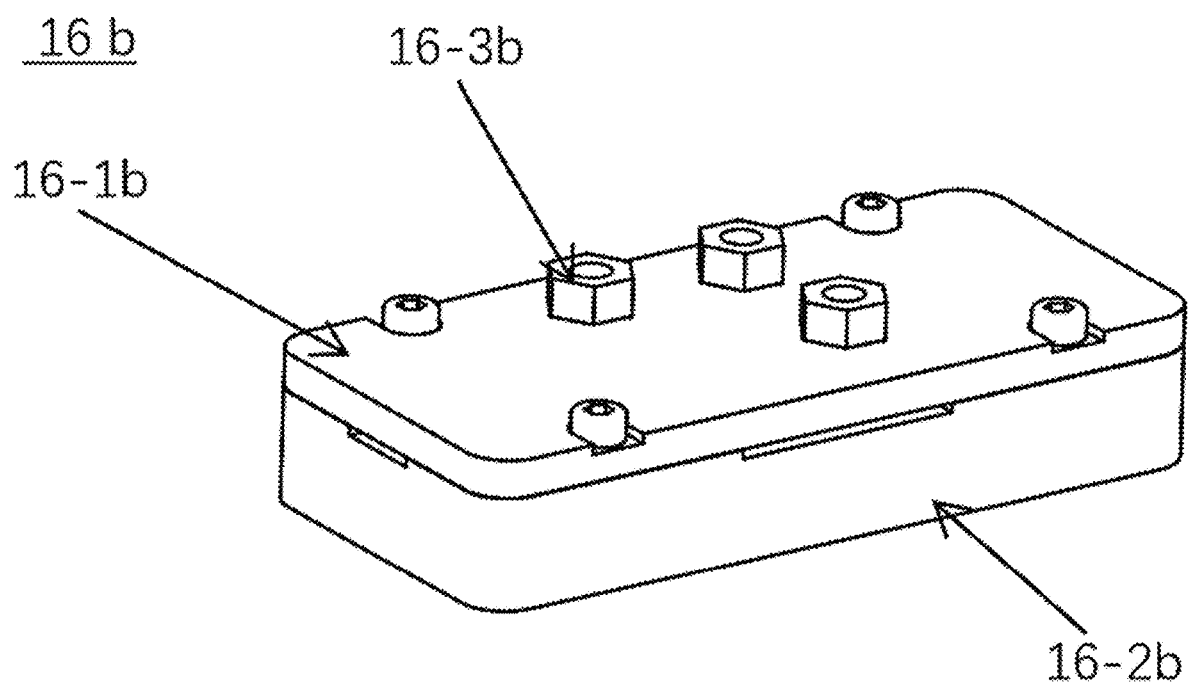
FIG. 11 is a side view of the chip cassette according to the second embodiment of the present disclosure.
Figure 12:
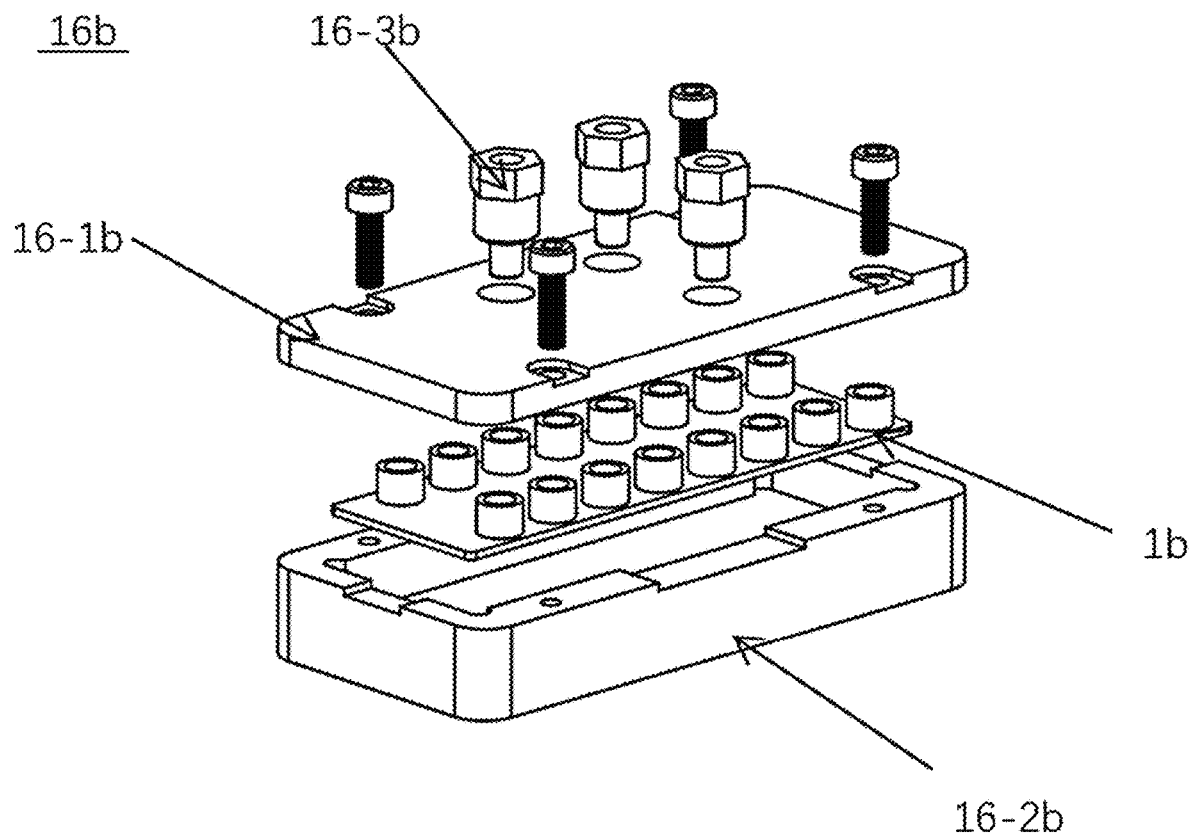
FIG. 12 is a schematic diagram of the structure of the chip cassette according to the second embodiment of the present disclosure.

In an implementation of the second embodiment of the present application, as shown in FIGS. 11-12, the microfluidics-based nanoparticle synthesis system further includes a chip cassette 16b in which the microfluidic chip 1b is provided; and the chip cassette 16b includes:
a cover board 16-1b of the chip cassette;
a bottom board 16-2b of the chip cassette, where the microfluidic chip 1b is provided between the cover board 16-1b of the chip cassette and the bottom board 16-2b of the chip cassette;
a connector 16-3b, where a plurality of connectors 16-3b is respectively connected to the organic phase port, the aqueous phase port and outlet of the microfluidic chip 1b, so as to connect to the organic phase reagent bottle 2b, the aqueous phase reagent bottle 3b and the mixer component 7b.

In the present application, there is no restriction on the structure of the connector 16-3b, as long as a sealed connection may be achieved, such as a connector connected with a threaded screw hole, a quick-plug connector or a Luer connector, the Luer connector is used in this embodiment.

In this embodiment, the microfluidic chip 1b is assembled in the chip cassette 16b in advance, and the microfluidic chip 1b may be easily fixed by installing the chip cassette 16b and is connected with the external pipeline by a Luer connector, so that the microfluidic chip 1b is connected to the organic phase reagent bottle 2b, the aqueous phase reagent bottle 3b, and the mixer component 7b.

In the microfluidic chip 1b, the aqueous phase and the organic phase are mixed in the flow channel, and special structures such as herringbone and Tesla may be used in the flow channel to achieve mixing to enhance the mixing efficiency. Such mixing can often achieve a mixing ratio of 90% or more in sub-second or even less time.

It should be noted that, in this embodiment, the automatic control of the system may be realized by controlling a flow sensor, a control valve, etc. through a controller (IPC 17b, industrial personal computer 17b, etc.).

In order to ensure the sterility and contamination-free requirements of the liquid and gas pathways in contact with the reagents, a filter element (such as a disposable filter element) is added at the places where the reagents may come into contact with the outside environment, such as the input port 19b of external gas source, the output port 20b of air pressure, the atmospheric communication venting port of the collection bottle 4b, the atmospheric communication venting port of the waste liquid bottle 14b, thereby preventing the entry of external contaminants.

At the same time, in order to prevent cross contamination between different experiments, all liquid pathways, gas pathways and components (e.g., microfluidic chip 1b, organic phase reagent bottle 2b, aqueous phase reagent bottle 3b, diluent bottle 6b, collection bottle 4b, waste liquid bottle 14b, bottle cap, filter element, pipeline, mixer component 7b, etc.) that may come into contact with reagents (organic phase, aqueous phase, diluent, etc.), can all be disposable consumables which may be disassembled after use, and new disposable consumables are installed before next use. For each valve and flow sensor, a disposable valve or flow sensor is used to prevent cross-contamination; alternatively, a non-contact valve or flow sensor is used to prevent liquid from contaminating the valve or flow sensor.

In addition to the strategy of using disposable consumables, all liquid pathways, gas pathways and components (e.g., microfluidic chip 1b, organic phase reagent bottle 2b, aqueous phase reagent bottle 3b, diluent bottle 6b, collection bottle 4b, waste liquid bottle 14b, bottle cap, filter element, pipeline, mixer component 7b, etc.) that may come into contact with reagents can all adopt pipelines or components made of materials that may be reused and can withstand high temperature, radiation, chemical and other sterilization methods, e.g., stainless steel etc. A user can directly inject liquid, steam, etc. into the pipeline for cleaning and sterilization, or perform high temperature sterilization. At this time, for each valve and flow sensor, a non-contact valve or flow sensor is used to prevent liquid from contaminating the valve or flow sensor.

In addition, according to the second embodiment of the present application, the microfluidics-based nanoparticle synthesis system (instrument) further includes a display, where the display is electrically connected to the controller (IPC 17b, industrial personal computer 17b). The design of the main operation interface of the nanoparticle synthesis system is designed to be left and right distribution in consideration of intuitiveness. The left side is divided into New Simple Mode Protocol, New Advanced Mode Protocol, Saved Protocol, and Cleaning Protocol. The right side is the nanoparticle synthesis animation, and the real-time time of the nanoparticle synthesis progress. The rightmost column is the functional area for starting and stopping nanoparticle synthesis and switching between the main operation interface and auxiliary functions, and they are in order as follows: the program start and stop buttons, returning to the main interface, the editing interface of advanced mode protocol (not available in the simple mode), and the real-time display diagram of the air pressure and flow rate, and the design interface. This area does not switch with mode switching.

You may enter the Simple Mode Protocol operation interface by clicking New Simple Mode Protocol. The operation interface is distributed as left and right sides. The left side of the operation interface is the editing interface of the protocol. Under the interface, you can choose to edit the protocol name, change the type of the aqueous and organic phase storage bottles (1 L, other volume types), change the total flow rate of the aqueous and organic phases (ml per minute), and change the ratio between the flow rate of the aqueous phase and that of the organic phase, and edit the total volume of the produced nanoparticle solution. By adjusting the total flow rate of the aqueous phase and the organic phase, and the ratio between the flow ratio of the aqueous phase and that of the organic phase, the size of the generated nanoparticles may be changed. Changing the total volume of the produced nanoparticle solution can flexibly adjust the amount of nanoparticles as required. At the same time, in order to reduce the disturbance caused by flow rate regulation and obtain nanoparticles with more consistent particle size, under this protocol you may choose pretreatment to remove a certain volume of initially generated nanoparticles. In addition, a user may choose to use the dilution module, and when the dilution module is selected, the diluent may be pushed out from the diluent storage bottle by pressure control or flow rate control. If flow rate control is selected, the user can input a dilution factor so that the nanoparticle solution is diluted in a certain proportion. The right side of the operation interface is the display interface of the protocol, which sequentially displays the total flow rate of the sample, the ratio between the flow ratio of the aqueous phase and that of the organic phase, the type of the sample tube, the amount of the aqueous phase and the organic phase, the total volume of the synthesized nanoparticle solution, and the total time required for the synthesis. When the synthesis protocol starts running, the time progress bar will advance in real time, and display the current synthesis progress and remaining time.

The above-mentioned microfluidics-based nanoparticle synthesis system can perform high-precision pressure control, and can also perform high-precision flow rate control after providing a flow sensor. High throughout and highly uniform nanoparticle synthesis may be achieved by combining with the use of microfluidic chip that can achieve high-efficiency and rapid mixing, in addition, a dilution module (a diluent bottle, a mixer component, etc.) is also added, therefore the synthesized nanoparticle solution may be diluted stably and rapidly as required, so as to stably retain the nanoparticles.

Figure 7:
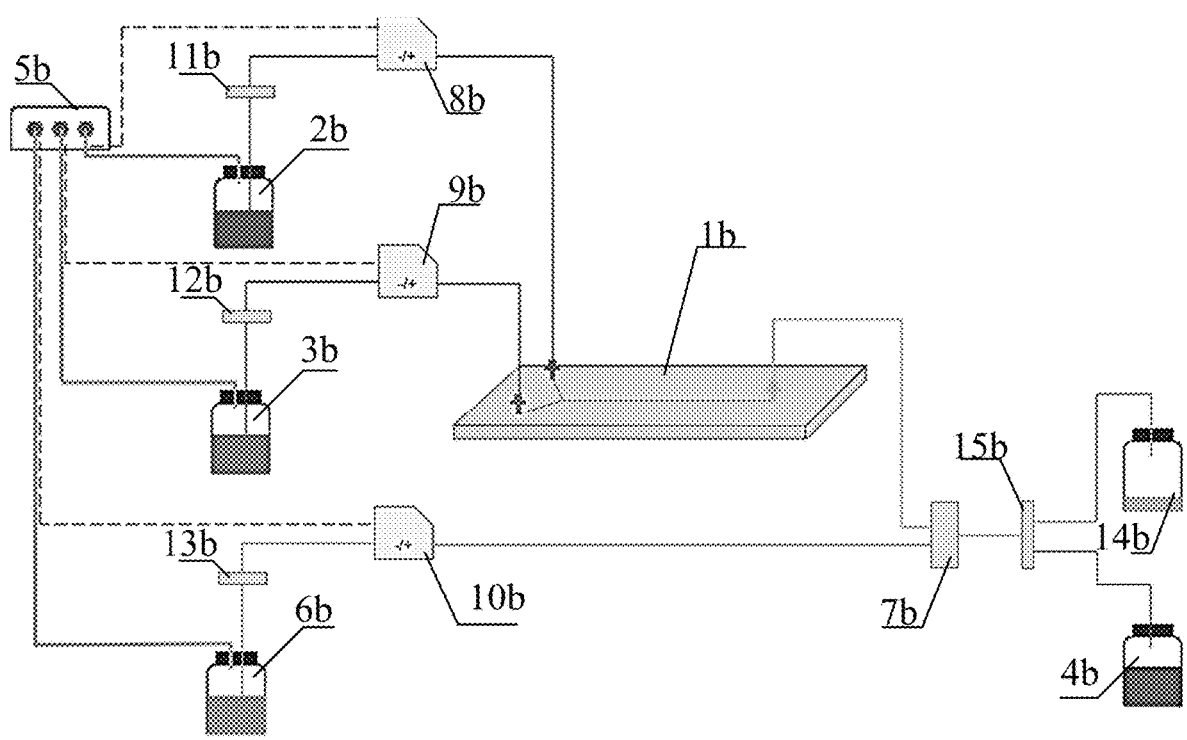
FIG. 7 is a schematic diagram of the structure of the microfluidics-based nanoparticle synthesis system according to the second embodiment of the present disclosure.
Figure 8:
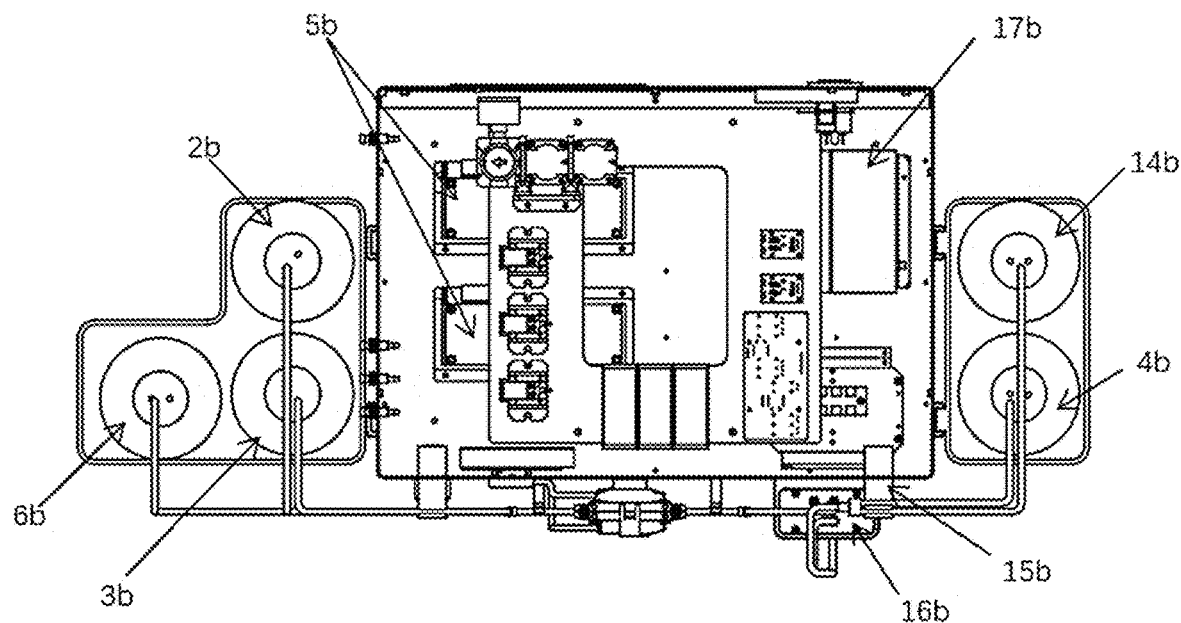
FIG. 8 is a top view of the microfluidics-based nanoparticle synthesis system according to the second embodiment of the present disclosure.
Figure 9:
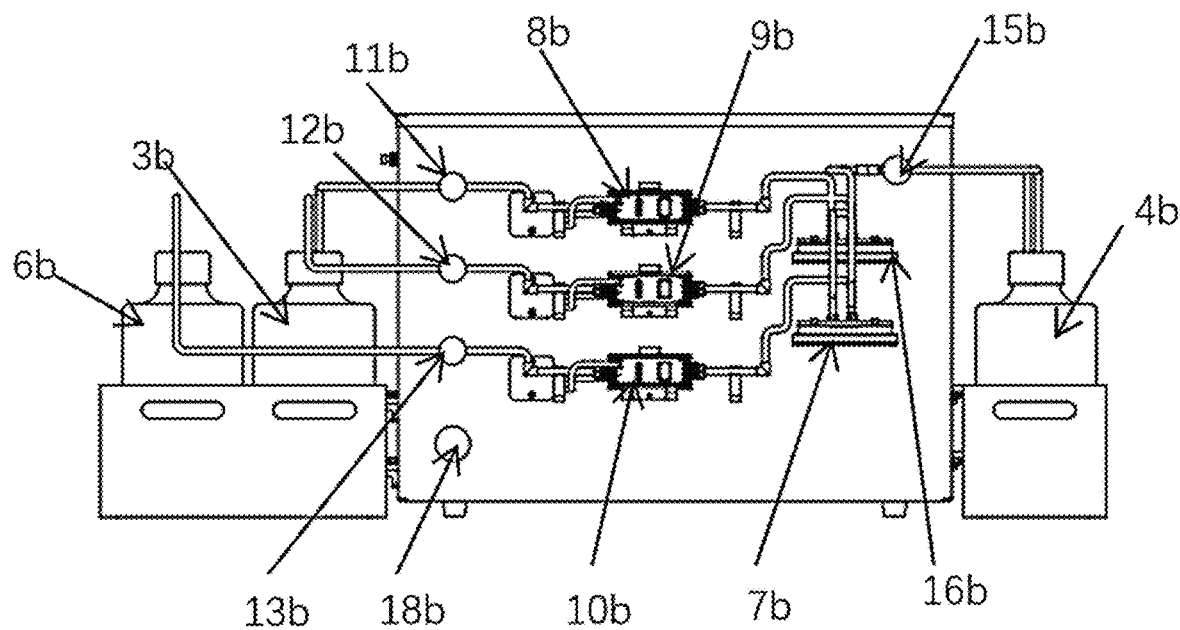
FIG. 9 is a front view of the microfluidics-based nanoparticle synthesis system according to the second embodiment of the present disclosure.

Exemplarily described below, the operation process of the microfluidics-based nanoparticle synthesis system (according to the second embodiment of the present application) as shown in FIG. 7 (the following is an example of using a disposable pipeline consumable pack) includes:

STEP 1: connecting the power supply and the display screen, and then turning on the switch.

STEP 2: connecting the external gas source to the corresponding connector of the nanoparticle synthesis system.

STEP 3: loading the reagent into the corresponding reagent bottle.

STEP 4: installing the corresponding pipeline consumables according to the instructions.

Consumable Pack #1: 1. opening each flow sensor; 2. clamping the hard pipe part of the pipeline into the flow sensor; 3. clamping both ends of the hard pipe into the pipe clamp; 4, closing the lock of the flow sensor; 5. clamping the soft pipe into the pinch valve.

Consumable Pack #2: 1. clamping the soft pipe of the waste liquid bottle into the NO port of the pinch valve; 2. clamping the soft pipe of the collection bottle into the NC port of the pinch valve.

Consumable Pack #3: 1. placing the chip cassette at the corresponding position; 2. connecting the corresponding connector to the corresponding pipeline.

STEP 5: removing the sealing plug of the air pressure output port of the device, and inserting the gas pipe of each reagent bottle into the corresponding air pressure output port.

STEP 6: running the corresponding program.

After running

STEP7: removing the collection bottle and screwing on the sealing cap.

STEP8: removing all the remaining consumables and discard them.

STEP9: plugging the air pressure output port of the device with a sealing plug.

STEP10: disinfecting the entire instrument with alcohol and wiping it clean.

where:

Consumable Pack #1 contains: 1. reagent bottle×1; 2. pre-connected pipeline×1 set.

Consumable Pack #2 contains: 1. reagent bottle×1; 2. waste liquid bottle×1; 3. pre-connected pipeline×1 set; 4. sealing cap×1.

Consumable Pack #3 contains: 1. chip cassette×1 (including pre-connected pipeline)

Consumable Pack #4 Contains: 1. collection bottle; 2. sealing cap×1.

Consumable Pack #5 contains: 1. reagent bottle×1; 2. pre-connected pipeline×1 set; 3. mixer×1.

Finally, it should be noted that orientations or position relationships indicated by terms "top", "bottom", "left", "right", "vertical", "horizontal", "inner", "outer", and the likes are based on the orientation or position relationships shown in the accompanying drawings. These terms are just used to facilitate the description of the present disclosure and simplify the description, but not to indicate or imply that the mentioned device or elements must have a specific orientation and must be established and operated in a specific orientation, and thus, these terms cannot be understood as a limitation to the present disclosure. Moreover, the terms "first", "second", and "third" are used only for the purpose of description, and are not intended to indicate or imply relative importance.

The above embodiments are used only to describe the technical solutions of the present disclosure, and are not intended to limit its scope. Although the present disclosure is described in detail with reference to the above embodiments, those ordinary skilled in the art should understand that they can still modify the technical solutions described in the above embodiments, or make equivalent substitutions to some technical features therein. These modifications or substitutions do not make the essence of the corresponding technical solutions depart from the spirit and scope of the technical solutions of the embodiments of the present disclosure.

What is claimed is:

1. A microfluidics-based nanoparticle synthesis system, comprising:
   a microfluidic chip;
   a reagent bottle, wherein the reagent bottle is connected to the microfluidic chip;
   a flow control assembly, wherein the flow control assembly comprises a pressure controller, the pressure controller is configured for controlling a pressure in the reagent bottle;
   a washing solution bottle; and
   a control valve, wherein the microfluidic chip is connected to the reagent bottle and the washing solution bottle by the control valve, wherein the first flow control assembly is provided between the control valve and the reagent bottle, and the second flow control assembly is provided between the control valve and the washing solution bottle.

2. The microfluidics-based nanoparticle synthesis system according to claim 1, wherein the reagent bottle comprises an organic phase reagent bottle and an aqueous phase reagent bottle, and the washing solution bottle comprises an organic phase washing solution bottle and an aqueous phase washing solution bottle.

3. The microfluidics-based nanoparticle synthesis system according to claim 2, wherein two flow control assemblies are provided, each of the two flow control assemblies further comprises a flow sensor, the flow sensor is electrically connected to the pressure controller.

4. The microfluidics-based nanoparticle synthesis system according to claim 3, further comprising a waste liquid bottle and a collection tube, wherein the waste liquid bottle and the collection tube are each connected to the microfluidic chip through the control valve.

5. The microfluidics-based nanoparticle synthesis system according to claim 2, wherein the control valve is a three-way valve.

6. The microfluidics-based nanoparticle synthesis system according to claim 5, wherein the aqueous phase reagent bottle and the aqueous phase washing solution bottle are respectively connected to a normally-closed valve port of a first three-way valve and a normally-open valve port of the first three-way valve, and a common valve port of the first three-way valve is connected to a common valve port of a third three-way valve through a first flow sensor; and wherein a normally-closed valve port of the third three-way valve is in a fluid communication with an aqueous phase port of the microfluidic chip, and a normally-open valve port of the third three-way valve is connected to the waste liquid bottle;
the organic phase reagent bottle and the organic phase washing solution bottle are respectively connected to a normally-closed valve port of a second three-way valve and a normally-open valve port of the second three-way valve, and a common valve port of the second three-way valve is connected to a second flow sensor, and the second flow sensor is connected to a common valve port of a fourth three-way valve;
the waste liquid bottle is further connected to a normally-open valve port of a fifth three-way valve, a normally-closed valve port of the fifth three-way valve is connected to the collection tube, and a common valve port of the fifth three-way valve is connected to an outlet of the microfluidic chip; and
the pressure controller is respectively connected to an air pressure control end of each of the aqueous phase reagent bottle, the aqueous phase washing solution bottle, the organic phase reagent bottle, and the organic phase washing solution bottle, wherein the pressure controller is respectively further connected to a pressure control end of each of the first flow sensor and the second flow sensor.

7. A microfluidics-based nanoparticle synthesis system, comprising:
a microfluidic chip;
a reagent bottle, wherein the reagent bottle is connected to the microfluidic chip; and
a flow control assembly, wherein the flow control assembly comprises a pressure controller the pressure controller is configured for controlling a pressure in the reagent bottle;
wherein the reagent bottle comprises an organic phase reagent bottle and an aqueous phase reagent bottle, and the organic phase reagent bottle and the aqueous phase reagent bottle are respectively connected to an organic phase port of the microfluidic chip and an aqueous phase port of the microfluidic chip;
the system further comprises:
a collection bottle for collecting a first fluid, wherein the first fluid is discharged from an outlet of the microfluidic chip;
a diluent bottle, wherein a pressure in the diluent bottle is also controlled by the pressure controller;
a mixer component, wherein the mixer component is respectively connected to the diluent bottle, the outlet of the microfluidic chip and the collection bottle, wherein a second fluid and the first fluid is mixed in the mixer component before the first fluid and the second fluid enters the collection bottle, wherein the second fluid is discharged from the diluent bottle.

8. The microfluidics-based nanoparticle synthesis system according to claim 7, wherein the system further comprises:
a first flow sensor, wherein the first flow sensor is provided between the organic phase reagent bottle and the organic phase port of the microfluidic chip, wherein the pressure in the organic phase reagent bottle is controlled by the pressure controller based on a first flow rate feedback, wherein the first flow rate feedback is from the first flow sensor to control a flow rate to reach a preset value; and/or
a second flow sensor, wherein the second flow sensor is provided between the aqueous phase reagent bottle and the aqueous phase port of the microfluidic chip, wherein the pressure in the aqueous phase reagent bottle is controlled by the pressure controller based on a second flow rate feedback, wherein the second flow rate feedback is from the second flow sensor to control the flow rate to reach a preset value; and/or
a third flow sensor, wherein the third flow sensor is provided between the diluent bottle and the mixer component, wherein a pressure in the diluent bottle is controlled by the pressure controller based on a third flow rate feedback, wherein the third flow rate feedback is from the third flow sensor to control the flow rate to reach a preset value.

9. The microfluidics-based nanoparticle synthesis system according to claim 7, wherein the system further comprises:
a first control valve, wherein the first control valve is provided between the organic phase reagent bottle and the organic phase port of the microfluidic chip to control a fluid passage to be an open or closed state; and/or
a second control valve, wherein the second control valve is provided between the aqueous phase reagent bottle and the aqueous phase port of the microfluidic chip to control the fluid passage to be the open or closed state; and/or
a third control valve, wherein the third control valve is provided between the diluent bottle and the mixer component to control the fluid passage to be the open or closed state.

10. The microfluidics-based nanoparticle synthesis system according to claim 7, wherein the system further comprises:
a waste liquid bottle;
a fourth control valve, wherein the fourth control valve is respectively connected to the mixer component, the waste liquid bottle, and the collection bottle, wherein a third fluid is configured to enter the collection bottle or the waste liquid bottle, wherein the third fluid is discharged from the mixer component.

11. The microfluidics-based nanoparticle synthesis system according to claim 10, wherein the system further comprises:
- a fifth control valve, wherein the fifth control valve is provided between the organic phase reagent bottle and the organic phase port of the microfluidic chip, and the fifth control valve is connected to the waste liquid bottle, wherein a fourth fluid is configured to enter the organic phase port of the microfluidic chip or the waste liquid bottle, wherein the fourth fluid is discharged from the organic phase reagent bottle; and/or
- a sixth control valve, wherein the sixth control valve is provided between the aqueous phase reagent bottle and the aqueous phase port of the microfluidic chip, and the sixth control valve is connected to the waste liquid bottle, wherein a fifth fluid is configured to enter the aqueous phase port of the microfluidic chip or the waste liquid bottle, wherein the fifth fluid is discharged from the aqueous phase reagent bottle;
- wherein the collection bottle is in a fluid communication with the atmosphere through a filter element.

12. The microfluidics-based nanoparticle synthesis system according to claim 7, wherein each of a volume of the organic phase reagent bottle, a volume of the aqueous phase reagent bottle, and a volume of the diluent bottle is at least 0.1 L.

13. The microfluidics-based nanoparticle synthesis system according to claim 7, wherein the mixer component is a three-way mixer, wherein the three-way mixer has a three-way connector with a Y or T shape.

14. The microfluidics-based nanoparticle synthesis system according to claim 7, wherein the system further comprises a chip cassette, the microfluidic chip is provided in the chip cassette; and
the chip cassette comprises:
- a cover board of the chip cassette;
- a bottom board of the chip cassette, wherein the microfluidic chip is provided between the cover board of the chip cassette and the bottom board of the chip cassette;
- a connector, wherein a plurality of connectors is respectively connected to the organic phase port, the aqueous phase port and the outlet of the microfluidic chip to connect to the organic phase reagent bottle, the aqueous phase reagent bottle and the mixer component.

15. The microfluidics-based nanoparticle synthesis system according to claim 14, wherein the connector is a Luer connector.

16. A device using a microfluidics-based nanoparticle synthesis system, wherein the microfluidics-based nanoparticle synthesis system comprises:
- a microfluidic chip:
- a reagent bottle, wherein the reagent bottle is connected to the microfluidic chip; and
- a flow control assembly, wherein the flow control assembly comprises a pressure controller, the pressure controller is configured for controlling a pressure in the reagent bottle;

wherein the device comprises a bench, wherein a microfluidic chip assembly and the flow control assembly are provided above the bench, and an organic phase reagent bottle, an aqueous phase reagent bottle, an organic phase washing solution bottle, and an aqueous phase washing solution bottle are provided side by side below the bench; and a waste liquid bottle is provided at an inner side of the reagent bottle, and a height-adjustable sampling needle assembly is provided on each of the organic phase reagent bottle and the aqueous phase reagent bottle.

17. The device according to claim 16, wherein the microfluidic chip assembly comprises a base and a transfer tooling, wherein the transfer tooling is embedded in the base, and a chip is provided in the transfer tooling; a flip cover is provided at one side of the base, and a locking mechanism is provided at the other side of the base, wherein the locking mechanism is for locking the flip cover; an inner wall of the flip cover is provided with a guide rod, wherein the guide rod is for cooperating with a protruding sample injection channel on the chip, and a through hole is formed in a center of the guide rod; and
the flip cover is provided at one side of the base through an elastic assembly, a pivot of the flip cover is provided on the elastic assembly, and a sample injection channel mark is provided on each of the transfer tooling and the base.

18. A synthesis method using the microfluidics-based nanoparticle synthesis system according to claim 1, comprising the following steps:
- S1. configuring the flow control assembly to extrude out an aqueous phase and an organic phase respectively from an aqueous phase reagent bottle and an organic phase reagent bottle according to a presetting, and allowing the aqueous phase and the organic phase to respectively enter an aqueous phase port of the microfluidic chip and an organic phase port of the microfluidic chip correspondingly through three-way valves for a nanoparticle synthesis; and
- S2. when synthesized nanoparticles do not meet a size requirement, delivering the synthesized nanoparticles to a waste liquid bottle for collection through a fifth three-way valve; and when the synthesized nanoparticles meet the size requirement, delivering the synthesized nanoparticles to a collection tube for collection through the fifth three-way valve.

19. The synthesis method according to claim 18, further comprising pre-processing steps before synthesis steps: configuring the flow control assembly to extrude out the aqueous phase and the organic phase respectively from the aqueous phase reagent bottle and the organic phase reagent bottle according to the presetting, and allowing the aqueous phase and the organic phase to enter the waste liquid bottle correspondingly through the three-way valves for removing bubbles in pipelines.

* * * * *